United States Patent [19]

Baker et al.

[11] Patent Number: 5,090,240

[45] Date of Patent: Feb. 25, 1992

[54] FLOWMETERS

[75] Inventors: Roger C. Baker, St. Albans; Edward H. Higham, Reigate, both of England

[73] Assignee: National Research Development Corp., London, England

[21] Appl. No.: 524,871

[22] Filed: May 18, 1990

[30] Foreign Application Priority Data

May 19, 1989 [GB] United Kingdom ............... 8911597

[51] Int. Cl.$^5$ .............................................. G01F 5/00
[52] U.S. Cl. ....................................... 73/197; 73/203
[58] Field of Search ................. 73/195, 196, 197, 203

[56] References Cited

U.S. PATENT DOCUMENTS

| 3,803,912 | 4/1974 | Ohno | 73/197 X |
| 4,475,387 | 10/1984 | Hawk et al. | 73/202 |
| 4,616,509 | 10/1986 | Feller | 73/861.05 |
| 4,653,321 | 3/1987 | Cunningham et al. | 73/197 |

FOREIGN PATENT DOCUMENTS 2043916A 8/1980 United Kingdom .

Primary Examiner—Herbert Goldstein
Attorney, Agent, or Firm—Nixon & Vanderhye

[57] ABSTRACT

A bypass flowmeter assembly has a plurality of branch pipes (11) connected in parallel with a main pipe (10), with at least one of the branch pipes having a respective flowmeter (14), and at least another of the branch pipes having respective selectively operable pipe closure means (12, 13). Preferably each branch pipe has a flowmeter and closure means. Preferably also control means (30) are provided to operate the closure means through a routine of successive phases of respectively different patterns of branch pipe flow. This allows derivation of main pipe flow rate on the basis of branch pipe flowmeter measurements with comparison of flowmeter outputs between different phases to eliminate high order measurement error, averaging of such outputs to reduce low order measurement error, or by computation to eliminate unknown factors. The assembly can be connected serially with a similar assembly (20) to monitor relative variations in the total flow of interest and adjust the actual measurement of this flow.

15 Claims, 1 Drawing Sheet

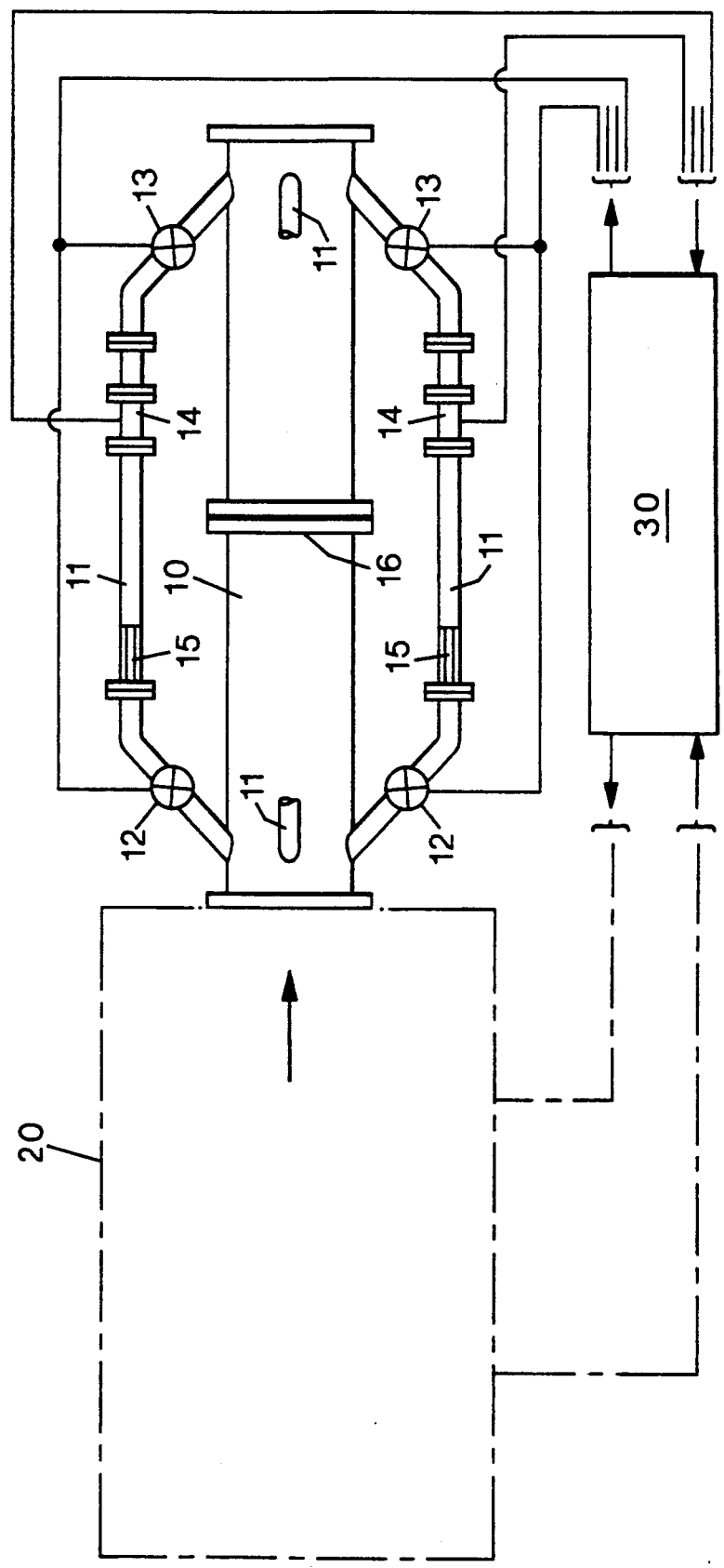

FLOWMETERS

This invention concerns flowmeters and more particularly bypass flowmeters.

A bypass flowmeter involves the provision of a flowmeter in association with a branch pipe, itself connected in parallel with a relatively larger main pipe, to provide a measure of flow in the main pipe. The use of such flowmeters is well-established, typically in circumstances where direct measurement is difficult and/or costly in terms of equipment. However, bypass flowmeters tend to be associated with lower precision measurement because it will often be difficult to establish and/or sustain an appropriate relationship between the branch flow actually measured and the main flow of interest.

An object of the present invention is to reduce this last difficulty and to this end there is provided, in or for a pipe line, an assembly comprising a main pipe, and a plurality of branch pipes of relatively smaller diameter than and individually connected in parallel with said main pipe, at least one of said branch pipes having connected therewith a respective flowmeter, and at least another of said branch pipes having connected therewith a respective selectively operable pipe closure means.

Preferably each branch pipe has a respective flowmeter and pipe closure means.

Also, the branches are preferably of like form.

Use of the proposed assembly in a pipeline to convey fluid through the main pipe will involve a sequence of operational phases in each of which the pipe closure means are variously operated or not to leave open an individual one, a sub-group or all of the pipes. Each such phase is to involve at least one flowmeter being effective to provide a measurement of the related flow.

In any event a set of flow measurements is provided from which improved precision is obtained by comparison to eliminate individual measurements so different as to represent high order error, averaging to reduce low order errors due to individual measurement variations, or computation effectively to solve simultaneous equations represented by the individual measurements and thereby to eliminate unknown factors.

The present invention is clarified by consideration of the accompanying drawing which schematically illustrates, by way of example, one assembly as proposed thereby.

The illustrated assembly includes a length of main pipe 10 flanged or otherwise formed at its ends for serial connection in a pipe line of corresponding size.

A plurality of relatively smaller branch pipes 11 are individually connected in parallel with the main pipe 10 to extend between the end regions of the latter. Each branch pipe incorporates a pair of isolating valves 12, 13 respectively located adjacent its opposite ends and a flowmeter 14 between these valves, the flowmeter being of vortex or other suitable form. Also each branch pipe can appropriately incorporate a flow straightener 15 located upstream of the respective flowmeter but downstream of the isolator valve 12 in that direction, which valve is itself accordingly adjacent the input end of the branch pipe.

Lastly in the principal structure of the illustrated assembly, the main pipe is provided with an orifice plate 16 or other flow restricting formation to promote flow through the branch pipes when in use.

In a relatively simple embodiment of the assembly only two branch pipes are provided, with these pipes and their incorporated elements being of like form and also suitably uniformly sited around the main pipe. Use for flow measurement involves a two-stage operational sequence. In one stage a single branch is opened and the flow through that branch is measured by way of the relevant flowmeter, and in the other stage both branches are opened and, as these branches are alike, the flow through only one of them is measured. In fact this operation is such that the assembly can, in theory, be simplified further such that only one branch is provided with a flowmeter while the other alone has pipe closure means.

In any event, each stage involves two basic operational conditions, namely, that the overall flow through the assembly is continuous and that the main pipe and branch pipe are subject to the same pressure drop between their connections. These conditions can be represented by the equations $$Q_T = Q_{M1} + Q_{B1} \tag{1}$$

and $$K_{M1} Q_{M1}^2 = K_{B1} Q_{B1}^2 \tag{2}$$

for the first stage with one branch open, where $Q_T$, $Q_{M1}$, $Q_{B1}$ are the volume flow rates through the overall assembly, the main pipe and the branch pipe, and $K_{M1}$, $K_{B1}$ are loss coefficients related to the main and branch pipes.

Similarly, for the second stage, $$Q_T = Q_{M2} + 2Q_{B2} \tag{3}$$

and $$K_{M2} Q_{M2}^2 = K_{B2} Q_{B2}^2 \tag{4}$$

where $Q_{M2}$, $Q_{B2}$ are the volume flow rates for the main pipe and each branch pipe with two branches open, and $K_{M2}$, $K_{B2}$ are loss coefficients for the main and branch pipes.

It is important to recognise the fact that $K_{M1}$ and $K_{M2}$, and to a lesser extent $K_{B1}$ and $K_{B2}$, may vary and that this may occur due to change in flow rate or due to age such as by wear. However, in the first instance, it can be assumed that $K_{M2} = K_{M1}$ and $K_{B2} = K_{B1}$, and then these equations can be solved to give the expression $$Q_T = \frac{Q_{B1} Q_{B2}}{Q_{B1} - Q_{B2}} \tag{5}$$

whereby the overall flow rate of interest is determined from the branch measurements.

This solution rests on the assumption that the losses in the individual pipes are constant, with those in the main pipe being essentially due to the orifice plate or other restrictor. It is also assumed that, because the branches are alike, the flows in the individual branches are the same for any one operational phase. This last assumption is not critical to the extent that a similar operating procedure and analysis to that above can be applied when the branches are not alike. However, the first assumption above regarding loss coefficients represents approximations which may or may not be acceptable in different practical circumstances and further measures are contemplated within the scope of the invention to accommodate this fact.

In circumstances where the approximations are generally acceptable the above simple situation can be improved by obtaining the measurements $Q_{B1}$, $Q_{B2}$ from each of the two branches, whereby comparison can be effected to indicate the existence of a significant error and/or averaging to reduce minor error.

Further improvements can arise with similar assemblies involving more than two branch pipes having respective flowmeters and isolating valves. Given that there is a remote likelihood of significant error arising from more than one branch at any time, such error can be related to a specific branch by comparing successive measurements from the individual branches and a defective branch can be put out of use pending corrective action by maintenance or replacement. Also the scope for averaging is much increased by the possibility for measurements with individual branches opened, different pairs of branches opened, and so on up to all branches open.

If the approximations are not acceptable then different measures are appropriate to derive $Q_T$ and these will probably involve use of a dedicated computer.

Also, or in addition, it may be appropriate to allow for possible change in $Q_T$ as the overall flow pattern through the open pipes changes from one operational phase to another. This can be done by deploying two assemblies of the presently proposed form in series with one such assembly being used to monitor the relative size of $Q_T$ whereby operation of the other assembly can be adjusted. The two assemblies for this purpose need not be alike in sizing or layout.

Whether or not a dedicated computer is used for determination of $Q_T$ it will probably be appropriate to employ some such facility to control the operational phases, check the correct functioning of the flowmeters and indicate instances of significant error or failure, and other tasks. In this connection it will be appreciated that maintenance can be facilitated by provision of the proposed assembly whereby a branch or components thereof are removable without disrupting other flows and related operations.

The accompanying drawing is in fact augmented for completeness to indicate schematically the provision of a further assembly 20 upstream of that so far described, whereby the relative size of $Q_T$ can be monitored, and microprocessor-based means 30 to control the operational phases, receive flowmeter measurements, compare and/or average such measurements, and derive a measure of the main pipe flow.

While this description so far has been given with reference to the measurement and determination of volume flow rates, similar procedures can be applied in respect of velocities and also, by incorporating a measure of density, mass flow rate. Indeed if the density of the flow medium is suitably uniform through the assembly it may be possible to indicate mass flow directly by use of flowmeters which sense mass.

We claim:

1. In or for a pipe line:
a main pipe;
a plurality of branch pipes each of relatively smaller diameter than and individually connected in parallel with said main pipe, and each such branch pipe having a respective flowmeter and selectively operable pipe closure means connected therewith; and
means operable with said main pipe open to flow for providing a representation of flowrate through said main pipe in collective response to outputs from each of said flowmeters by subjecting said outputs to one of the procedures of comparison, averaging and computation therebetween.

2. An assembly according to claim 1, wherein each of said pipe closure means comprises a pair of valves respectively connected in the associated pipe at opposite ends thereof, and each of said branch pipes incorporates a flow straigtener located between the associated flowmeter and upstream pipe closure valve.

3. An assembly according to claim 1 comprising control means operable in a predetermined routine of successive phases for setting each said pipe closure means to one of its open and closed conditions, the pattern of set conditions being different in each one phase from any other phase of said routine.

4. An assembly according to claim 3 having at least three of said branch pipes, wherein said routine includes three successive phases in each of which only a respective different one of the pipe closure means is set to open, and comprising means for comparing the outputs of the flowmeters operable during said three phases.

5. An assembly according to claim 3, wherein said routine includes successive phases in which the same number of said pipe closure means is set to open and said assembly comprises means for averaging outputs from said flowmeters between successive ones of said phases.

6. An assembly according to claim 3 comprising means for computing a representation of flow rate through said main pipe in response to the outputs of said flowmeters during all of said phases.

7. An assembly according to claim 6 in combination with a further main pipe in serial connection with the first-mentioned main pipe, and means for monitoring a flow rate through said further main pipe, said computing means being operably adjustable in response to said monitoring means.

8. An assembly according to claim 7, wherein said monitoring means comprise a plurality of further branch pipes of relatively smaller diameter than and individually connected in parallel with said further main pipe, at least one of said further branch pipes having connected therewith a respective further flowmeter, and at least another of said further branch pipes having connected therewith respective selectively operable further pipe closure means.

9. In or for a pipe line:
a main pipe;
a plurality of branch pipes each of relatively smaller diameter than said main pipe, each having substantially the same flow capacity, and each individually connected in parallel with said main pipe;
a respective individual flowmeter connected with at least one of said branch pipes; and
a respective individual pipe closure means connected with at least another of said branch pipes than said one branch pipe.

10. An assembly according to claim 9, wherein each of said pipe closure means comprises a pair of valves respectively connected in the associated branch pipe at opposite ends thereof.

11. An assembly according to claim 9, wherein each of said branch pipes having a respective flowmeter incorporates a flow straightener upstream thereof.

12. In or for a pipe line, an assembly comprising:
a main pipe;
at least three branch pipes each of relatively smaller diameter than and individually connected in parallel with said main pipe, each of said branch pipes having a respective flowmeter and pipe closure means connected therewith;
control means operable in a predetermined routine of three successive phases for setting each said pipe closure means to one of its open and closed positions wherein in each of said three phases only a respective different one of said pipe closure means is set to open, the pattern of set conditions being different in each one phase from any other phase of said routine; and means for comparing the outputs of the flowmeter operable during said three phases.

13. An assembly according to claim 12 comprising means for averaging outputs from said flowmeters between successive ones of said phases.

14. An assembly according to claim 12 comprising means for computing a representation of flow rate through said main pipe in response to the outputs of said flowmeters.

15. An assembly according to claim 14 in combination with a further main pipe in or for serial connection with the first-mentioned main pipe, and means for monitoring a flow rate through said further main pipe, said computing means being operably adjustable in response to said monitoring means.

* * * * *